(12) United States Patent
Saito et al.

(10) Patent No.: US 9,222,524 B2
(45) Date of Patent: Dec. 29, 2015

(54) DRIVE FORCE TRANSMISSION DEVICE

(71) Applicants: Nissan Motor Co., Ltd., Yokohama, Kanagawa (JP); JATCO LTD, Fuji (JP)

(72) Inventors: Katsuyuki Saito, Hadano (JP); Kazuhiro Miyachi, Yamato (JP); Kazutoshi Shimozono, Yokohama (JP); Kiyoto Tamura, Yokohama (JP); Yutaka Yoshikawa, Fujinomiya (JP); Akihisa Kawai, Zama (JP)

(73) Assignees: Nissan Motor Co., Ltd., Yokohama (JP); JATCO Ltd, Fuji (JP)

( * ) Notice: Subject to any disclaimer, the term of this patent is extended or adjusted under 35 U.S.C. 154(b) by 0 days.

(21) Appl. No.: 14/353,472

(22) PCT Filed: Nov. 5, 2012

(86) PCT No.: PCT/JP2012/078588
§ 371 (c)(1),
(2) Date: Apr. 22, 2014

(87) PCT Pub. No.: WO2013/069595
PCT Pub. Date: May 16, 2013

(65) Prior Publication Data
US 2014/0262674 A1 Sep. 18, 2014

(30) Foreign Application Priority Data
Nov. 8, 2011 (JP) .................................. 2011-244331

(51) Int. Cl.
*F16D 25/12* (2006.01)
*F16D 13/52* (2006.01)
(Continued)

(52) U.S. Cl.
CPC ................ *F16D 13/52* (2013.01); *B60K 6/387* (2013.01); *B60K 6/405* (2013.01); *B60K 6/48* (2013.01);
(Continued)

(58) Field of Classification Search
None
See application file for complete search history.

(56) References Cited

U.S. PATENT DOCUMENTS 4,844,484 A * 7/1989 Antonini et al. .............. 277/561
6,340,339 B1 * 1/2002 Tabata et al. ...................... 475/5
(Continued)

FOREIGN PATENT DOCUMENTS

JP   1-143432 U    10/1989
JP   1989-143432 U    10/1989
(Continued)

OTHER PUBLICATIONS

An English translation of the Japanese Office Action for the corresponding Japanese patent application No. 2013-542970 issued on Sep. 9, 2014.

*Primary Examiner* — Rodney H Bonck
(74) *Attorney, Agent, or Firm* — Global IP Counselors, LLP

(57) ABSTRACT

A drive force transmission device includes a clutch operatively interposed between a hub member and a drum member to selectively transmit drive power therebetween. A first rotating shaft member is coupled to the hub member to rotate with the hub member. A second rotating shaft member is coupled to a separating wall part of the drum member to rotate with the drum member. A support member rotatably supports the second rotating shaft member via a bearing. The support member includes a restriction part that restricts axial movement of an outer race of the bearing. A bottom portion of the separating wall part is a radially offset towards the bearing space with respect to a top portion of the separating wall so that the bottom portion radial overlaps with the restriction part as viewed perpendicular to a rotational axis of the drum member.

4 Claims, 5 Drawing Sheets

(51) Int. Cl.
  *B60K 6/387* (2007.10)
  *B60K 6/405* (2007.10)
  *B60K 6/48* (2007.10)
  *B60K 6/543* (2007.10)
  *F16D 25/0638* (2006.01)
  *F16D 25/08* (2006.01)

(52) U.S. Cl.
  CPC ............ *B60K 6/543* (2013.01); *F16D 25/0638* (2013.01); *F16D 25/083* (2013.01); *F16D 25/12* (2013.01); *B60K 2006/4825* (2013.01); *F16D 25/082* (2013.01); *F16D 2300/08* (2013.01); *Y02T 10/6221* (2013.01); *Y02T 10/6252* (2013.01)

(56) References Cited

U.S. PATENT DOCUMENTS

| | | | |
|---|---|---|---|
| 2007/0175726 A1* | 8/2007 | Combes et al. | 192/87.11 |
| 2010/0288597 A1* | 11/2010 | Kuwahara et al. | 192/85.61 |
| 2012/0062077 A1* | 3/2012 | Isogai et al. | 310/68 B |
| 2012/0080248 A1* | 4/2012 | Kasuya et al. | 180/65.21 |
| 2013/0281259 A1* | 10/2013 | Larkin et al. | 477/5 |

FOREIGN PATENT DOCUMENTS

| | | |
|---|---|---|
| JP | 10-339336 A | 12/1998 |
| JP | 2010-151313 A | 7/2010 |

\* cited by examiner

DRIVE FORCE TRANSMISSION DEVICE

CROSS-REFERENCE TO RELATED APPLICATIONS

This application is a U.S. National stage application of International Application No. PCT/JP2012/078588, filed Nov. 5, 2012, which claims priority to Japanese Patent Application No. 2011-244331 filed in Japan on Nov. 8, 2011, the contents of which are hereby incorporated herein by reference.

BACKGROUND

1. Field of the Invention

The present invention relates to a drive force transmission device that is suitable for drive systems in hybrid vehicles.

2. Background Information

In the past, hybrid drive force transmission devices have been known in which a dry clutch that transmits drive power and disconnects drive power from the engine is disposed in the drum interior space of a clutch drum. This conventional device has a clutch hub shaft that is linked integrally with a clutch hub, a clutch drum shaft that is linked integrally with the clutch drum, and a unit housing that rotatably supports the clutch drum shaft via a pair of bearings, which are provided around the dry multi-plate clutch (e.g., Japanese Laid-Open Patent Application No. 2010-151313).

SUMMARY

However, this conventional hybrid drive force transmission device has a structure in which the separating wall part of the clutch drum is disposed offset towards the clutch space so as to circumvent a restriction part that restricts axial movement of the bearing outer race. For this reason, when the constituent elements at the periphery of the clutch are laid out in a predetermined space in the axial direction, there has been the problem that the clutch space is decreased due to the separating wall part that is disposed offset towards the clutch space relative to the restriction part.

The present invention focuses on the above problem, it being an object of the invention to provide a drive force transmission device whereby it is possible to increase the size of the clutch space in which the first rotating shaft member and hub member that are coupled together are disposed when laying out the constituent elements at the periphery of the clutch within a predetermined space in the axial direction.

In order to achieve the above objective, a drive force transmission device is provide that basically comprises a hub member, a drum member, a clutch, a first rotating shaft member, a second rotating shaft member and a support member. The drum member has a cylindrical part and a separating wall part extending radially inward from the cylindrical part to partition a drum interior space into a bearing space and a clutch space. The clutch is operatively interposed between the hub member and the drum member to transmit drive power upon engagement and cease to transmit drive power upon disengagement. The clutch has a plate member supported by the cylindrical part of the drum. The first rotating shaft member is coupled to the hub member to rotate integrally with the hub member. The second rotating shaft member is coupled to the separating wall part of the drum member to rotate integrally with the drum member. The support member is disposed at an outer circumferential position on the second rotating shaft member and rotatably supports the second rotating shaft member via a bearing. The support member includes a restriction part that restricts axial movement of an outer race of the bearing. The restriction part is provided at an end position of the support member towards the separating wall part. The separating wall part has a bottom portion being partially disposed at an inner circumferential position with respect to the restriction part. The bottom portion of the separating wall part has a radially extending centerline that is offset by a bearing-side offset amount towards the bearing space with respect to a radially extending centerline of a top portion of the separating wall part so that the separating wall part radial overlaps with the restriction part as viewed perpendicular to a rotational axis of the drum member.

Thus, the separating wall part of the drum member is disposed at a position towards the inner circumference of the restriction part for restricting axial movement of the bearing outer race, offset towards the bearing space so as to overlap with the restriction part in the radial direction. Specifically, the separating wall part that partitions the drum interior space of the drum member is disposed so as to have been moved in the axial direction towards the first bearing from an offset position that lies towards the clutch space to an offset position that lies towards the bearing space. For this reason, when the drum interior space is a space having the same predetermined volume, disposing the separating wall part offset towards the bearing space will increase the clutch space correspondingly in accordance with the reduction in the bearing space. As a result, when the constituent elements of the clutch periphery are laid out in the predetermined space in the axial direction, it is possible to increase the size of the clutch space in which the first rotating shaft member and hub member that are coupled together are disposed.

BRIEF DESCRIPTION OF THE DRAWINGS

Referring now to the attached drawings which form a part of this original disclosure.

DETAILED DESCRIPTION OF THE EMBODIMENTS

Figure 1:
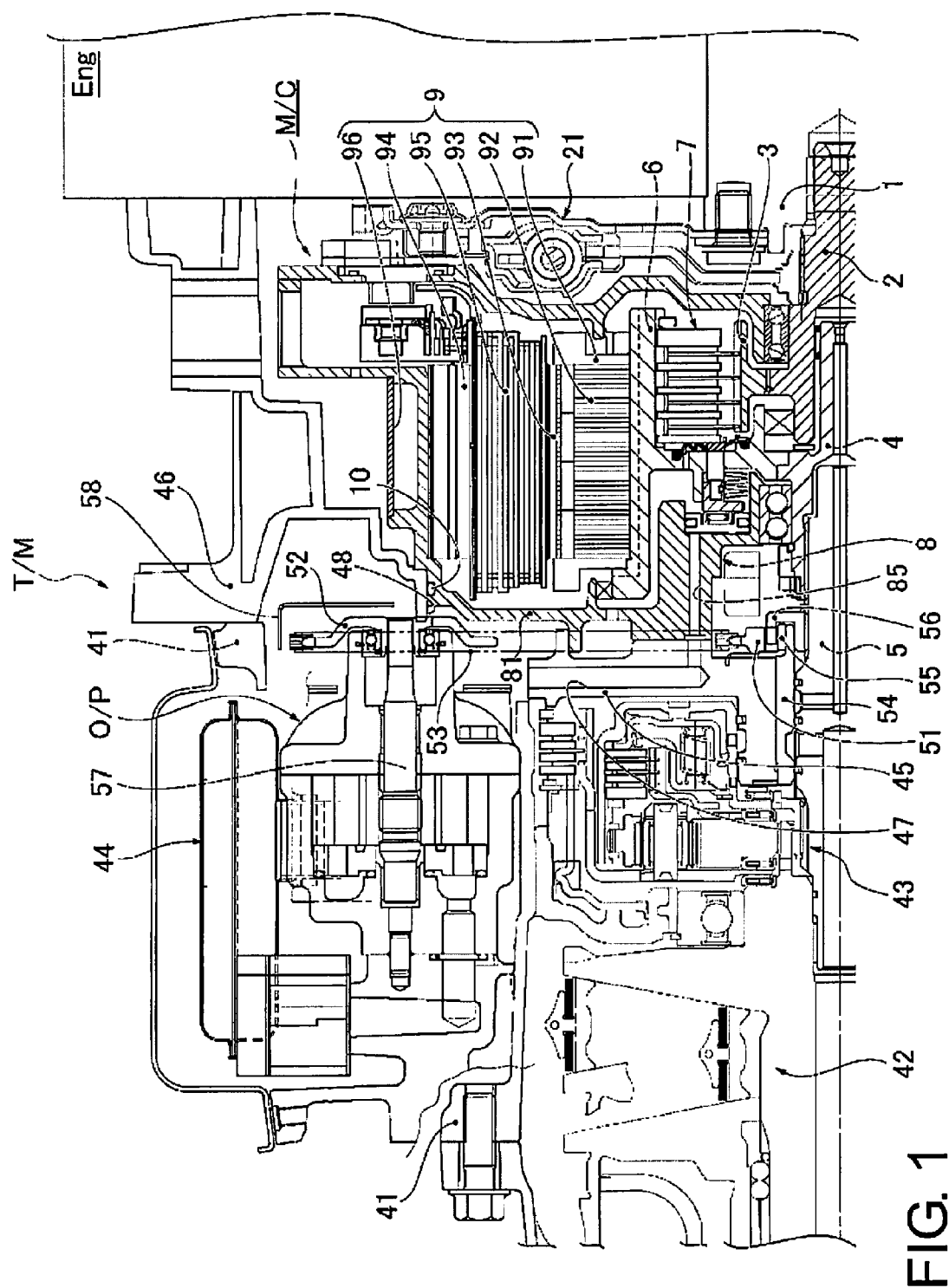
FIG. 1 is a schematic overview of the hybrid drive force transmission device of Embodiment 1 (example of a drive force transmission device).

A preferred embodiment of the drive force transmission device of the present invention is described below based on Embodiment 1 and Embodiment 2 shown in the drawings.

Embodiment 1

First, the configuration will be described. The configuration of the hybrid drive force transmission device of Embodiment 1 (an example of a drive force transmission device) is described below under the headings: General system configuration, Dry multi-plate clutch peripheral configuration, and Clutch periphery constituent element layout configuration.

General System Configuration

FIG. 1 is a general schematic diagram showing the hybrid drive force transmission device of Embodiment 1. The general system configuration of the device is described below with reference to FIG. 1.

The hybrid drive force transmission device of Embodiment 1, as shown in FIG. 1, comprises an engine Eng, a motor and clutch unit M/C, and a transmission unit T/M. The motor and clutch unit M/C is coupled to the engine output shaft 1 of the engine Eng has a clutch hub shaft 2, a clutch hub 3, a clutch drum shaft 4, a transmission input shaft 5, a clutch drum 6, a dry multi-plate clutch 7, and a slave cylinder 8.

With the hybrid drive force transmission device of Embodiment 1, when the dry multi-plate clutch 7 that is normally open has disengaged, the motor/generator 9 and the transmission input shaft 5 are linked via the clutch drum 6 and the clutch drum shaft 4, producing an electric drive mode. When the dry multi-plate clutch 7 is made to engage under hydraulic pressure by the slave cylinder 8, the engine Eng and the motor/generator 9 are linked via the engaged dry multi-plate clutch 7, producing a hybrid drive mode. The engine output shaft 1 and the clutch hub shaft 2 are linked via a damper 21.

The motor and clutch unit M/C (shaded cross-sectional region in FIG. 1) has the dry multi-plate clutch 7, the slave cylinder 8, and the motor/generator 9. The dry multi-plate clutch 7 is engaged by linkage with the engine Eng and interrupts transmission of drive power from the engine Eng. The slave cylinder 8 carries out hydraulic control of engagement and disengagement of the dry multi-plate clutch 7. The motor/generator 9 is disposed at an outer circumferential position on the clutch drum 6 of the dry multi-plate clutch 7 and transmits power to the transmission input shaft 5. In this motor and clutch unit M/C, a unit housing 81 having a first clutch hydraulic path 85 to the slave cylinder 8 is provided while preserving sealing with an O-ring 10.

The motor/generator 9 is a synchronous alternating current motor having a rotor support frame 91 that is integrally formed with the clutch drum 6 and a motor rotor 92 that is supported by and fixed on the rotor support frame 91 and that contains an embedded a permanent magnet. There also is a motor stator 94 that is fixed on the unit housing 81 and is disposed at the motor rotor 92 with an air gap 93 interposed, and a stator coil 95 that is wound onto the motor stator 94. A water jacket 96 that allows flow of cooling water is formed in the unit housing 81.

The transmission unit T/M is linked and connected to the motor and clutch unit M/C and has a transmission housing 41, a V-belt stepless transmission mechanism 42, and an oil pump O/P. The V-belt stepless transmission mechanism 42 is housed in the transmission housing 41, with the V-belt suspended between two pulleys, providing a stepless variable gear ratio by varying the belt contact diameter. The oil pump O/P is a hydraulic oil source that provides hydraulic pressure to the required components. With the oil pump pressure as the source pressure, hydraulic pressure is conducted to the required components from a control valve (not shown) that modulates the pressure, e.g., the transmission hydraulic pressure, that is provided to the pulley chamber or the clutch/brake hydraulic pressure. This transmission unit T/M also has a forward/reverse switching mechanism 43, an oil tank 44, an end plate 45, and a clutch unit case 46. The clutch unit case 46 is fixed integrally on the transmission housing 41. The end plate 45 has a second clutch hydraulic path 47.

The oil pump O/P is driven as a result of transfer of rotational drive torque from the transmission input shaft 5 via a chain drive mechanism. The chain drive mechanism has a drive-side sprocket 51 that rotates along with rotational drive of the transmission input shaft 5, a driven-side sprocket 52 that rotationally drives a pump shaft 57, and a chain 53 that is suspended on both sprockets 51, 52. The drive-side sprocket 51 is mounted between the transmission input shaft 5 and an end plate 45 and is rotatably supported via a brush 55 on a stator shaft 54 that is fixed to the transmission housing 41. Thus, splined joining occurs with the transmission input shaft 5, and rotational drive torque from the transmission input shaft 5 is transmitted via a first adaptor 56 that fits via teeth on the drive-side sprocket 51.

Dry Multi-Plate Clutch Periphery Configuration

Figure 2:
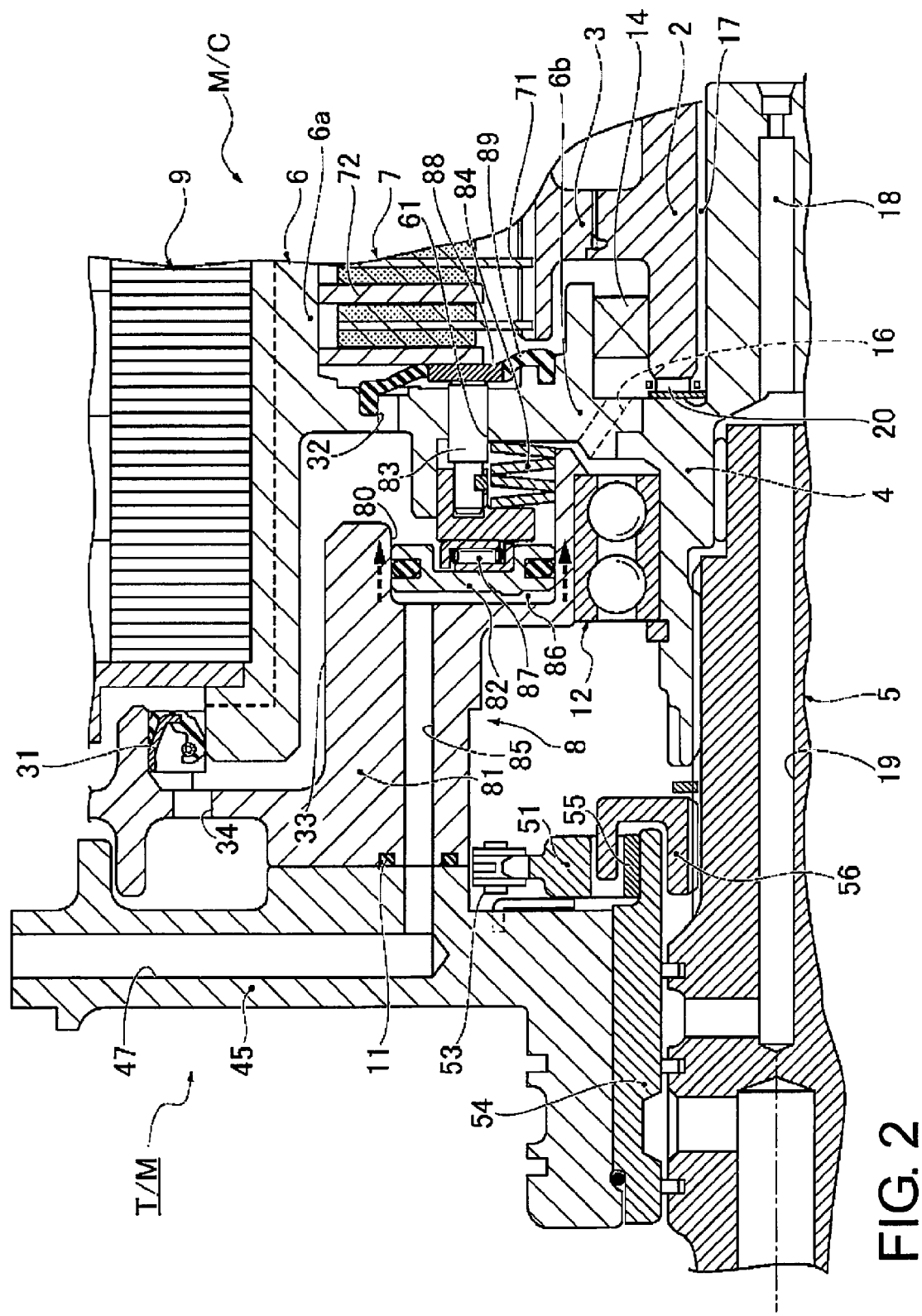
FIG. 2 is a sectional view showing the peripheral configuration of the dry multi-plate clutch in the hybrid drive force transmission device of Embodiment 1.
Figure 3:
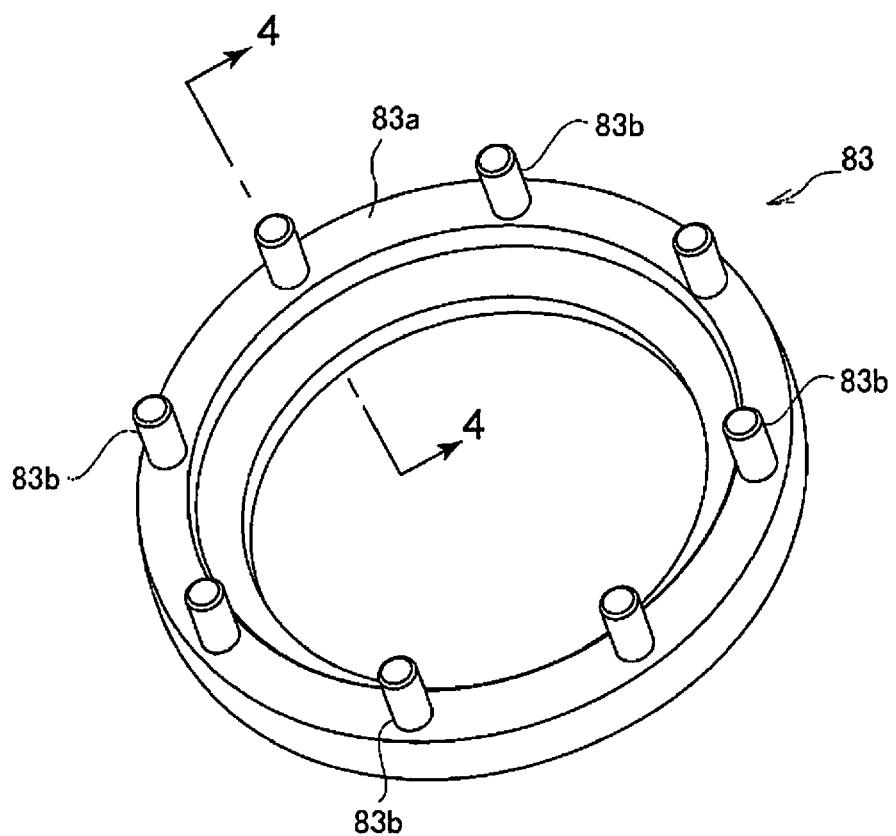
FIG. 3 is a perspective view showing the piston arm of the dry multi-plate clutch of Embodiment 1.
Figure 4:
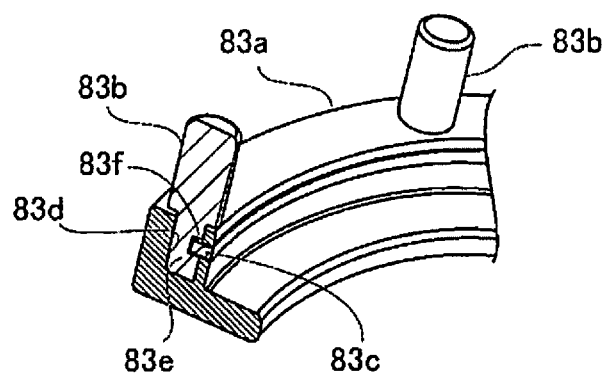
FIG. 4 is a sectional view across line 4-4 in FIG. 3 showing the piston arm of the dry multi-plate clutch of Embodiment 1.

FIG. 2 is a sectional view showing the configuration of the periphery of the dry multi-plate clutch in the hybrid drive force transmission device of Embodiment 1. FIG. 3 is an oblique view showing the piston arm of the dry multi-plate clutch. FIG. 4 is a sectional view across line A-A in FIG. 3 showing the piston arm. The configuration of the periphery of the dry multi-plate clutch 7 is descried below based on FIGS. 2 to 4.

The clutch hub 3 is integrally coupled to the clutch hub shaft 2 that is fixed on the engine output shaft 1 of the engine Eng. As shown in FIG. 2, drive plates 71 of the dry multi-plate clutch 7 are held on the clutch hub 3 by splined joining.

The clutch drum 6 is integrally coupled to the transmission input shaft 5 of the transmission unit T/M. As shown in FIG. 2, driven plates 72 (plate members) of the dry multi-plate clutch 7 are held on this clutch drum 6 by splined joining.

With the dry multi-plate clutch 7, the drive plates 71 and the driven plates 72 are interposed alternately between the clutch hub 3 and the clutch drum 6 so that they are aligned in multiple plates. In other words, by engagement of the dry multi-plate clutch 7, torque transfer between the clutch hub 3 and the clutch drum 6 is enabled, and by disengagement of the dry multi-plate clutch 7, torque transfer between the clutch hub 3 and the clutch drum 6 is disconnected.

The slave cylinder 8 is a hydraulic pressure actuator that controls engagement and disengagement of the dry multi-plate clutch 7 and is disposed at a location that is between the transmission unit T/M and the clutch drum 6. As shown in FIG. 2, the slave cylinder 8 has a piston 82 that is slidably provided in a cylinder hole 80 of the unit housing 81, a first clutch hydraulic path 85 that is formed in the cylinder housing 81 and conducts clutch pressure output by the transmission unit T/M, and a cylinder oil housing 86 that communicates with the first clutch hydraulic path 85. In addition to a piston arm 83, as shown in FIG. 2, a needle bearing 87, a return spring 84, and a hydraulic plate 88 are interposed between the piston 82 and the dry multi-plate clutch 7.

The piston arm 83 generates press force for the dry multi-plate clutch 7 as a result of the press force from the slave cylinder 8, and the piston arm is slidably provided in a through-hole 61 formed in the clutch drum 6. The return spring 84 is interposed between the piston arm 83 and the clutch drum 6 and is constituted by an assembly of a plurality of disc springs. The needle bearing 87 is interposed between the piston 82 and the piston arm 83, and the piston 82 inhibits induction of rotation that occurs along with rotation of the piston arm 83. The press plate 88 is provided integrally with an elastic support plate 89 and is elastically supported on the clutch drum 6. This press plate 88 and elastic support plate 89 constitute a partitioning elastic member that blocks leak oil from the sliding part of the piston arm 83 from flowing into the dry multi-plate clutch 7. In other words, the elastic support plate 89 and the press plate 88 that are sealed and fixed at the piston arm attachment location of the clutch drum 6 have a partitioning function that produces a wet space in which the slave cylinder 8 is disposed and a dry space in which the dry multi-plate clutch 7 is disposed.

The piston arm 83, as shown in FIGS. 3 and 4, is constituted by an arm body 83a that is formed in the shape of a ring, arm pins 83b that multiply protrude into the arm body 83a, and a snap ring 83c that fixes the arm pins 83b to the arm body 83a. When assembling the piston arm 83, the pin shoulders 83e of the arm pins 83b are inserted into the multiple pin holes 83d that are formed in the arm body 83a, producing a state in which the ring fitting grooves 83f that are formed on the pin shoulders 83e are directed into central locations in the arm body 83a. Next, force is applied to the snap ring 83c to carry out insertion from the inner surface side in a compressed state, whereupon the force applied to the snap ring 83c is released, allowing diameter expansion to occur as a result of the elastic restitution force. As a result, the snap ring 83c is fitted into the ring fitting groove 83f, and all of the arm pins 83b are simultaneously fixed in the arm body 83a.

The leak oil recovery path in Embodiment 1, as shown in FIG. 2, comprises a first bearing 12, a first oil seal 31, a leak oil path 32, a first recovery oil path 33, and a second recovery oil path 34. Specifically, the path is a circuit whereby leak oil from the sliding part of the piston 82 passes through the first recovery oil path 33 and the second recovery oil path 34 that are sealed by the first oil seal 31 and then returns to the transmission unit T/M. In addition, the path is a circuit whereby leak oil from the sliding part of the piston arm 83 passes through the leak oil path 32 that is sealed by the partitioning elastic members (press plate 88, elastic support plate 89) and the first recovery oil path 33 and second recovery oil path 34 that are sealed by the first oil seal 31 and then returns to the transmission unit T/M.

The first bearing 12 rotatably supports the clutch drum shaft 4 on the unit housing 81. In order to prevent shaft displacement of the clutch drum 6 with respect to the unit housing 81, no interposing elements other than the first bearing 12 are provided between the unit housing 81 and the clutch drum 6.

The first oil seal 31, as shown in FIG. 2, is disposed at a location that is downstream in the leak oil flow direction from the partitioning elastic members (press plate 88, elastic support plate 89), providing a seal between the opposing surfaces of the unit housing 81 and the clutch drum 6. This first oil seal 31 has a lip-seal structure in which a seal is formed as a result of the seal elastic force, and reliable sealing performance is ensured as a result of restriction of shaft core displacement of the clutch drum 6 by the first bearings 12, 12.

The leak oil path 32, as shown in FIG. 2, passes through the clutch drum 6 and is formed as a result of communication of the first recovery oil path 33 and the sealing blocking space produced by the partitioning elastic members (press plate 88, elastic support plate 89).

The first recovery oil path 33, as shown in FIG. 2, is formed by a gap resulting from opposition of the unit housing 81 and the clutch drum 6. The first oil seal 31 and the second recovery oil path 34 are disposed at a position that is radially outward from the sliding part of the piston arm 83 and the piston 82. As a result, the second recovery oil path 34 serves as an oil path that extends from the sliding part of the piston arm 83 and the piston 82 in a radially outward direction.

The second recovery oil path 34, as shown in FIG. 2, is formed as a short oil path that is downstream from the first oil seal 31 of the unit housing 81. A long oil path upstream from the first oil seal 31 serves as the first recovery oil path 33 due to the gap resulting from opposition of the unit housing 81 and the clutch drum 6.

The bearing lubricating oil path of Embodiment 1, as shown in FIG. 2, comprises a needle bearing 20, a second oil seal 14, a first shaft core oil path 19, a second shaft core oil path 18, and a lubricating oil path 16. This bearing lubricating oil path effects bearing lubrication through a route whereby the bearing lubricating oil from the transmission unit T/M passes through the needle bearing 20, the first bearings 12, 12 that rotatably support the clutch drum 6 on the unit housing 81, and the needle bearing 87 that is interposed between the piston 82 and the piston arm 83, before returning to the transmission unit T/M.

The needle bearing 20, as shown in FIG. 2, is set between the opposing surfaces of the clutch hub 3 and the clutch drum 6 that are opposite each other in the axial direction. As a result of this needle bearing 20, recursive movement of the clutch hub 3 and the clutch drum 6 in the axial direction is restricted, ensuring relative rotation between the clutch hub 3 and the clutch drum 6.

The second oil seal 14, as shown in FIG. 2, is interposed between the clutch hub shaft 2 and the clutch drum 6. This second sealing member 14 seals inflow of bearing lubrication oil from the wet space in which the slave cylinder 8 is disposed to the dry space in which the dry multi-plate clutch 7 is disposed.

The first shaft core oil path 19 is formed in the shaft core position of the transmission input shaft 5. The second shaft core oil path 18 is formed on the clutch drum 6 and communicates with the first shaft core oil path 19. The lubricating oil path 16 is formed in the clutch drum 6 and communicates with the second shaft core oil path 18 via the needle bearing 20 and a gap 17 with the clutch hub shaft 2.

Clutch Periphery Constituent Element Layout Configuration

Figure 5:
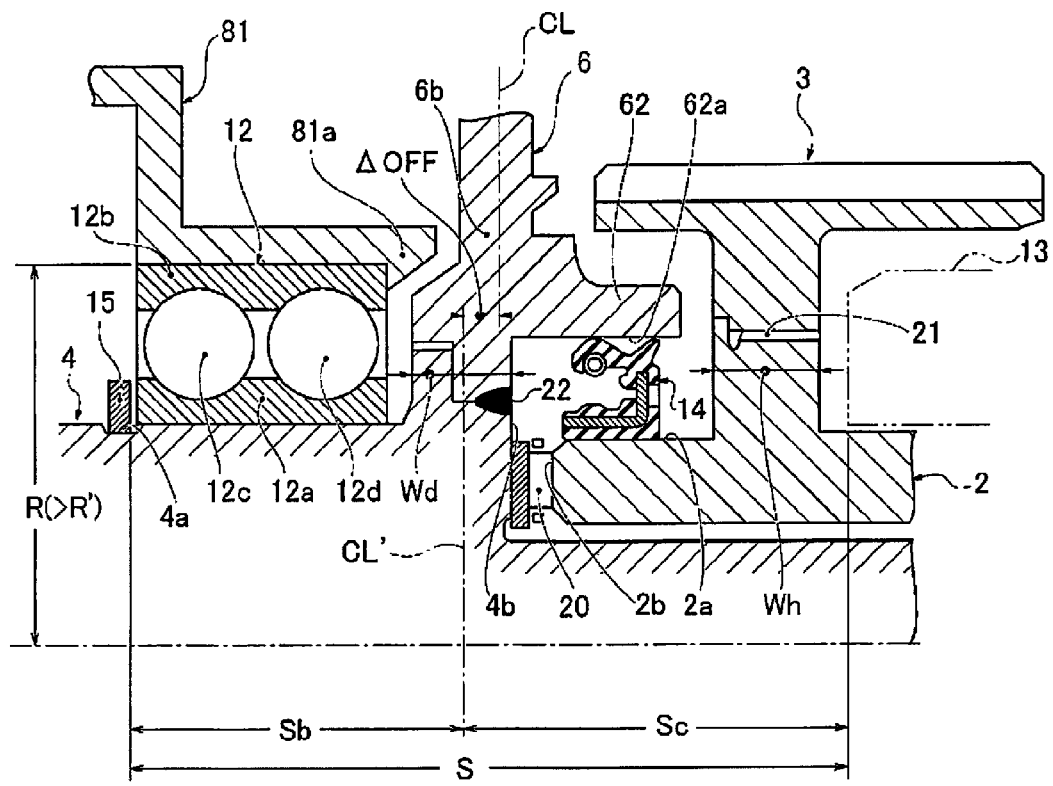
FIG. 5 is an enlarged sectional view showing the layout configuration of the constituent elements of the clutch periphery in the hybrid drive force transmission device of Embodiment 1.

FIG. 5 is an enlarged sectional view showing the layout configuration of the clutch periphery constituent elements in the hybrid drive force transmission device of Embodiment 1. The layout configuration of the constituent elements at the clutch periphery is described below with reference to FIGS. 2 and 5.

As shown in FIG. 5, constituent elements at the clutch periphery of the dry multi-plate clutch 7 (clutch) are the clutch hub shaft 2 (first rotating shaft member), the clutch hub 3 (hub member), the clutch drum shaft 4 (second rotating shaft member), the clutch drum 6 (drum member), the unit housing 81 (support member), the second oil seal 14 (oil seal), and the needle bearing 20 (thrust bearing).

The clutch hub shaft 2, as shown in FIG. 5, is coupled to the clutch hub 3 by serrated joining and rotates integrally with the clutch hub 3. In the serrated joining part 21, in which the clutch hub shaft 2 and the clutch hub 3 fit together via grooves, the clutch hub shaft 2 is inserted while cuttings are produced, and the accumulation thereof is used to prevent axial movement.

The clutch drum shaft 4, as shown in FIG. 5, is coupled to the clutch drum 6 by welded joining and rotates integrally with the clutch drum 6. The welded joining part 22 between the clutch drum shaft 4 and the clutch drum 6 forms a step where abutment occurs between the two in the axial direction. Of the surfaces that abut in the circumferential direction formed on both sides with the step surface interposed, the surface abutting on the bearing side is used for serrated joining, whereas the surface abutting on the clutch side is joined by welding.

The unit housing 81, as shown in FIG. 5, is provided at a location on the outer circumference of the clutch drum shaft 4 and is a static member whereby the clutch drum shaft 4 is rotatably supported via a first bearing 12 (bearing). The first bearing 12 serves as an integrated bearing in which two sets of balls 12c, 12d (rolling bodies) are interposed between an inner race 12a and an outer race 12b. Movement in the axial direction of the inner race 12a of the first bearing 12 is restricted by a snap ring 15 that is provided on a ring groove 4a of the clutch drum shaft 4.

The clutch drum 6, as shown in FIGS. 2 and 5, has a cylindrical part 6a on which the driven plates 72 (plate member) of the dry multi-plate clutch 7 are provided, and a separating wall part 6b that extends in a radially inward direction from the cylindrical part 6a and links with the clutch drum shaft 4, partitioning the drum inner space onto a bearing space Sb and clutch space Sc.

As shown in FIG. 5, a restriction part 81a that restricts motion of the outer race 12b of the first bearing 12 in the axial direction is provided at an end position of the unit housing 81 towards the separating wall part 6b. The separating wall part 6b is disposed at a position towards the inner circumference of the restriction part 81a, offset towards the bearing space Sb so as to overlap with the restriction part 81a in the radial direction. When the separating wall part 6b is disposed offset at a location towards the inner circumference of the restriction part 81a, the bearing outer diameter R of the integrated first bearing 12 is made larger than the bearing outer diameter R' when a pair of bearings is provided, each with one set of rolling bodies interposed between an inner race and outer race (refer to FIG. 6). As a result, a wider space is ensured in the radial direction towards the inner circumference of the restriction part 81a, and the separating wall part 6b is disposed offset in this space. Specifically, the gap in the axial direction between a centerline CL' in an axial direction towards the bottom of the separating wall part 6b and the centerline CL in the axial direction towards the top of the separating wall part 6b is taken as the bearing-side offset amount ΔOFF.

The second oil seal 14 is interposed between the two opposing surfaces in the radial direction of the outer circumferential surface 2a of the clutch hub shaft 2 and the inner circumferential surface 62a of the ring-shaped protrusion 62 formed on the separating wall part 6b, thereby inhibiting ingress of oil from the bearing space Sb to the clutch space Sc in which the dry multi-plate clutch 7 is disposed. In this second oil seal 14, the outer circumferential surface 2a of the clutch hub shaft 2 is the pressed-upon surface, and the inner circumferential surface 62a of the ring-shaped protrusion 62 formed on the separating wall part 6b is the seal surface.

The needle bearing 20 is interposed between opposing surfaces in the radial direction of the step surface 4b of the clutch drum shaft 4 and the end surface 2b of the clutch hub shaft 2. With this needle bearing 20, the step surface 4b of the clutch drum shaft 4 is the setting surface for the ring-shaped bearing member, and the end surface 2b of the clutch hub shaft 2 serves as the needle rolling surface. In other words, with the needle bearing 20, because the ring-shaped bearing member has an integrated structure, positioning (centering) can be carried out using one surface as a reference, and the only location that requires special processing such as carburizing to increase material hardness is thus the end surface 2b of the clutch hub shaft 2. In FIG. 5, a second bearing 13 that is rotatably supported on the unit housing 81 is interposed in the clutch hub shaft 2.

The operation of the device is described below. A comparative example will first be described under the heading Comparative example, and the operation of the hybrid drive force transmission device of Embodiment 1 will then be discussed under the heading Clutch periphery constituent element layout operation.

COMPARATIVE EXAMPLE

Figure 6:
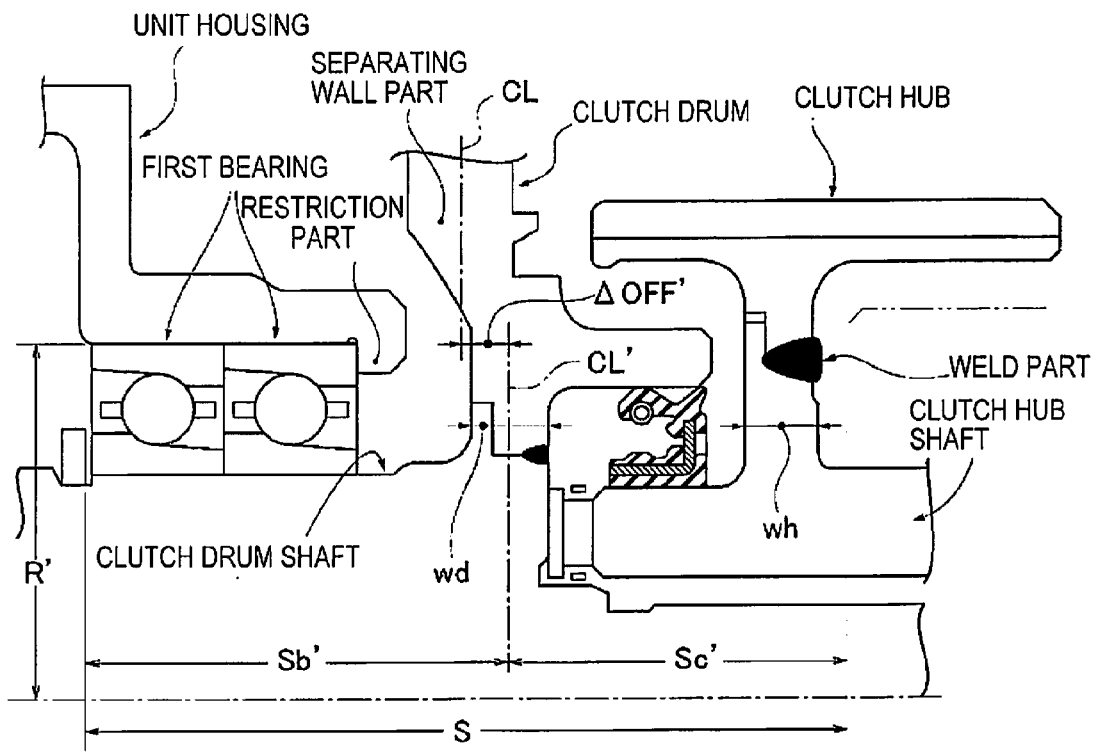
FIG. 6 is an enlarged view showing the layout configuration of the constituent elements of the clutch periphery in the hybrid drive force transmission device of a comparative example.

FIG. 6 is an enlarged sectional view showing the layout configuration of the clutch periphery constituent components in the hybrid drive force transmission device of a comparative example. The layout configuration of the constituent elements at the clutch periphery in the comparative example will be described below with reference to FIG. 6.

The comparative example is a hybrid drive force transmission device wherein the rotor of a motor/generator is supported on a clutch drum, and a dry multi-plate clutch that transmits drive and disconnects drive from an engine is disposed in a drum interior space of the clutch drum. This device has, disposed around the dry multi-plate clutch, a clutch hub shaft that is integrally linked with a clutch hub, a clutch drum shaft that is integrally linked with the clutch drum, and a unit housing that rotatably supports the clutch drum shaft via a pair of ball bearings. The clutch drum is coupled to the clutch drum shaft by a separating wall part that partitions the drum interior space into a bearing space Sb' and a clutch space Sc'. A restriction part that restricts motion of the outer race of the bearing in the axial direction is provided at an end location of the unit housing towards the separating wall part, and the separating wall part is disposed at an outer location of the restriction part offset towards the clutch space so that the restriction part is circumvented. Specifically, the comparative example is one in which the gap in the axial direction between the centerline CL' in the axial direction towards the bottom of the separating wall part and the centerline CL in the axial direction towards the top of the separating wall part is taken as the clutch-side offset amount ΔOFF'.

In the comparative example, the dividing wall part of the clutch drum has a structure in which the separating wall part of the clutch drum is offset towards the clutch space Sc' so that the restriction part that restricts movement of the outer race of the bearing in the axial direction is circumvented. For this reason, when the constituent elements at the clutch periphery are laid out in the predetermined space S in the axial direction, the clutch space Sc' is narrowed by the separating wall part that has been offset towards the clutch space relative to the restriction part.

As a result of narrowing of the clutch space Sc', it is impossible to avoid narrowing of the linkage width wh in the axial direction between the clutch hub shaft and the clutch hub. Consequently, linkage of the clutch hub shaft and the clutch hub, as shown in FIG. 6, is achieved by a weld connection that can ensure the desired linage strength while providing a narrow linkage width wh in the axial direction. With this welding connection, it is necessary to carry out a finishing process whereby the welded portion is finished by grinding after carrying out the welding operation. For this reason, productivity decreases and costs increase.

Clutch Periphery Constituent Element Layout Operation

In solving the problems with the comparative example, it is necessary to focus not only on the clutch hub and the clutch hub shaft on the upstream side of the clutch, but also on resolving problems with layout of the constituent elements on the downstream side of the clutch. The layout operation of the clutch periphery constituent elements reflecting this issue is described below.

First, the bearing is changed to an integrated first bearing 12 in which the ball diameter in the two ball bearings of the comparative example is increased, thereby increasing the transmission capacity and the size in the radial direction. As a result, the bearing outer diameter R of the first bearing 12 is larger than the bearing outer diameter R' of the two ball bearings of the comparative example, and a large space is ensured in the radial direction. At this time, the dimensions of the bearing outer diameter R of the first bearing 12 are set in consideration of both maintaining the oil chamber volume of the cylinder oil chamber 86 and providing piston control.

The separating wall part 6b of the clutch drum 6 is disposed offset towards the inner circumference of the restriction part 81a in the space that has been ensured by using the integrated first bearing 12 in which the size has been increased in the radial direction. This offsetting, as shown in FIG. 5, involves offsetting towards the bearing space Sb (bearing-side offset amount DOFF) at a position that is towards the inner circumference of the restriction part 81a, so that the restriction part 81a and the separating wall part 6b overlap in the radial direction.

Specifically, the separating wall part 6b that partitions the drum interior space of the clutch drum 6 is disposed so as to have been moved in the axial direction towards the first bearing 12 from an offset position that lies towards the clutch space Sc' (FIG. 6) to an offset position that lies towards the bearing space Sb (FIG. 5). For this reason, as shown in FIG. 5, assuming the drum interior space is a space S having the same predetermined volume, by disposing the separating wall part 6b offset towards the bearing space Sb, the clutch space Sc can be correspondingly increased in accordance with the reduction in the bearing space Sb.

Consequently when laying out the constituent elements at the clutch periphery in the predetermined space in the axial direction, it is possible to increase the clutch space Sc in which the clutch hub 3 and the clutch hub shaft 2 that are coupled together are disposed. As a result, the linkage width Wh (>wh) in the axial direction of the clutch hub 3 and the clutch hub shaft 2 can be ensured to be larger than in the comparative example, and serration joining is suitable for use as the linkage configuration for the clutch hub shaft 2 and the clutch hub 3. This serrated joining is carried out only by a step in which the clutch hub shaft 2 is inserted while cuttings are produced, and the accumulation thereof is used to prevent axial movement. For this reason, finish processing is not required as with the comparative example, and a reduction in cost as well as an increase in productivity can be achieved.

In addition, by increasing the size of the clutch space Sc to provide additional space allowance, the linking width Wd (>wd) in the axial direction between the clutch drum shaft 4 and the separating wall part 6b of the clutch drum 6 can be ensured to be longer than in the comparative example. As a result, an improvement in linkage strength between the separating wall part 6b and the clutch drum shaft 4 is achieved.

Next, the reason for switching to the integrated first bearing 12 in Embodiment 1 rather than using the two ball bearings of the comparative example is described below. When the two ball bearings are switched to an integrated first bearing 12, the number of parts can be decreased, but there is an attendant decrease in the bearing yield strength. However, by increasing the ball diameter of the integrated first bearing 12 the transmission capacity is increased, and the size in the radial direction is increased, preventing a decrease in the bearing yield strength. In addition, sufficient space in which the separating wall part 6b of the clutch drum 6 can be offset can be ensured in accordance with the increase in the bearing outer diameter R. In other words, a decrease in the number of parts can be achieved without needlessly increasing the bearing outer diameter.

The effects are described below. With the hybrid drive force transmission device of Embodiment 1, the listed below can be obtained.

(1) The drive force transmission device has a clutch (dry multi-plate clutch 7) that is interposed between a hub member (clutch hub 3) and a drum member (clutch drum 6), the clutch transmitting drive power by engaging and ceasing transmitting of drive power by disengaging, a first rotating shaft member (clutch hub shaft 2) that links to the hub member (clutch hub 3) and rotates integrally with the hub member (clutch hub 3), a second rotating shaft member (clutch drum shaft 4) that is coupled to the drum member (clutch drum 6) and rotates integrally with the drum member (clutch drum 6), and a support member (unit housing 81) that is provided at an outer circumferential position on the second rotating shaft member (clutch drum shaft 4) and rotatably supports the second rotating shaft member (clutch drum shaft 4) via a bearing (first bearing 12); the drum member (clutch drum 6) having a cylindrical part 6a on which a plate member (driven plate 72) of the clutch (dry multi-plate clutch 7) is provided, and a separating wall part 6b that extends from the cylindrical part 6a radially inward and links with the second rotating shaft member (clutch drum shaft 4), partitioning the drum interior space into a bearing space Sb and a clutch space Sc, and a restriction part 81a that restricts movement of the outer race 12b of the bearing (first bearing 12) in the axial direction being provided at an end position of the support member (unit housing 81) towards the separating wall part 6b, the separating wall part 6b being disposed at an inner circumferential position on the restriction part 81a, offset towards the bearing space Sb so that there is overlap in the radial direction with the restriction part 81a. For this reason, the size of the clutch space Sc in which the first rotating shaft member (clutch hub shaft 2) and the hub member (clutch hub 3) that are coupled together are disposed can be increased when the constituent elements at the clutch periphery are laid out in the predetermined space in the axial direction.

(2) The bearing referred to above is an integrated bearing (first bearing 12) in which two sets of rolling bodies (balls 12c) are interposed between an inner race 12a and outer race 12b, and the outer diameter (bearing outer diameter R) of the integrated bearing (first bearing 12) is set larger than the outer diameter R' when a pair of bearings is used, each with one set of rolling bodies interposed between an inner race and an outer race. For this reason, in addition to the effect of (1), the number of parts is decreased, and a decrease in the bearing yield strength is prevented, while ensuring that there is sufficient space for offsetting the separating wall part 6b of the drum member (clutch drum 6).

Embodiment 2

Embodiment 2 is an example in which the seal surface and pressed-upon surface of the second oil seal 14 are different from in Embodiment 1.

Figure 7:
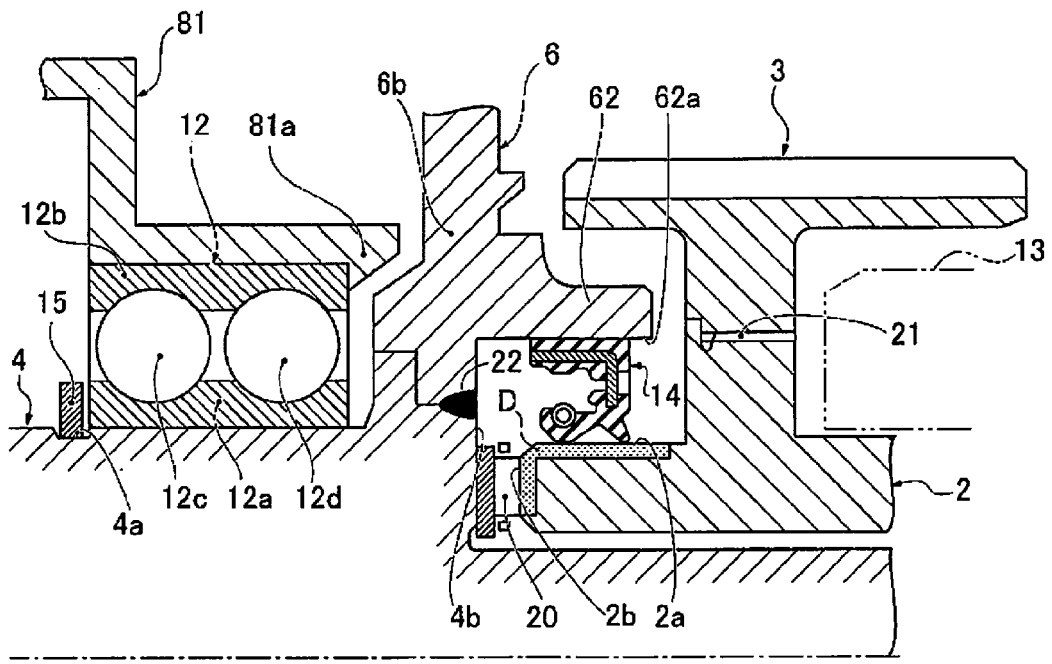
FIG. 7 is an enlarged sectional view showing the layout configuration of the constituent elements of the clutch periphery in the hybrid drive force transmission device of Embodiment 2.

The configuration will be described first. FIG. 7 is an enlarged sectional view showing the layout configuration of the constituent elements at the clutch periphery in the hybrid drive force transmission device of Embodiment 2. The layout configuration of the constituent elements at the clutch periphery will be described below with reference to FIG. 7.

The constituent elements at the clutch periphery in the dry multi-plate clutch 7 (clutch), as shown in FIG. 7, are a clutch hub shaft 2 (first rotating shaft member), a clutch hub 3 (hub member), a clutch drum shaft 4 (second rotating shaft member), a clutch drum 6 (drum member), a unit housing 81 (support member), a second oil seal 14 (oil seal), and a needle bearing 20 (thrust bearing).

A second oil seal 14 is interposed between opposing surfaces in the radial direction of an outer circumferential surface 2a of the clutch hub shaft 2 and an inner circumferential surface 62a of the ring-shaped protrusion 62 formed in the separating wall part 6b, suppressing ingress of oil from the bearing space Sb to the clutch space Sc in which the dry multi-plate clutch 7 is disposed. With the second oil seal 14, the inner circumferential surface 62a of the ring-shaped protrusion 62 formed on the separating wall part 6b is the pressed-upon surface, and the outer circumferential surface 2a of the clutch hub shaft 2 is the seal surface. The remainder of the configuration is similar to Embodiment 1. The same designations are provided for corresponding configuration elements, and descriptions of them are omitted.

The operation of the invention is described below. In order to additionally reduce the cost of the clutch periphery configuration, it is necessary to reduce the number of rotational members that are to be subjected to thermal treatment (e.g., carburization) in order to increase material hardness.

Figure 8:
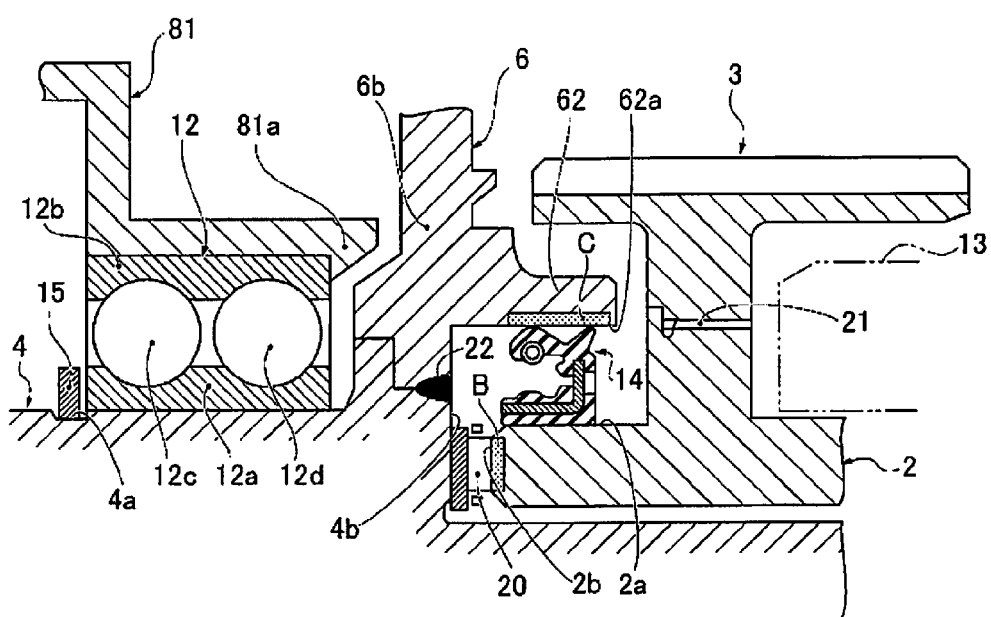
FIG. 8 is an enlarged sectional view showing the locations requiring special processing in the layout configuration of the constituent elements of the clutch periphery in the hybrid drive force transmission device of Embodiment 1.

Specifically, with the clutch peripheral configuration of Embodiment 1, as shown in FIG. 8, because the needle bearing 20 is made to have an integrated structure with the ring-shaped bearing member, the only location B requiring special processing such as carburizing in order to increase material hardness is the end surface 2b of the clutch hub shaft 2. However, with the second oil seal 14, the outer circumferential surface 2a of the clutch hub shaft 2 is used as the pressed-upon surface, and the inner circumferential surface 62a of the ring-shaped protrusion 62 formed in the separating wall part 6b is used as the seal surface. For this reason, the inner circumferential surface 62a of the ring-shaped protrusion 62 formed in the separating wall part 6b is a location C requiring special processing such as carburizing in order to increase material hardness. Consequently, locations B, C requiring special processing span two members, the clutch hub shaft 2, and the clutch drum 6.

In contrast, with the clutch periphery configuration in Embodiment 2, as shown in FIG. 7, because the needle bearing 20 is made to have an integrated structure together with the ring-shaped bearing member, locations requiring special processing such as carburizing to increase material hardness is limited only to the end surface 2b of the clutch hub shaft 2. Thus, with the second oil seal 14, the inner circumferential surface 62a of the ring-shaped protrusion 62 formed in the separating wall part 6b is the pressed-upon surface, and the outer circumferential surface 2a of the clutch hub shaft 2 is the seal surface. For this reason, the outer circumferential surface 2a of the clutch hub shaft 2 is a location requiring special processing such as carburizing in order to increase material hardness, and thus the location D requiring special processing is limited only to the clutch hub shaft 2.

Consequently, it is necessary only to subject the clutch hub shaft 2 to thermal treatment such as carburizing in order to increase material hardness, which additionally decreases the cost of the clutch periphery configuration. Otherwise, operation is similar to that of Embodiment 1, and descriptions are omitted.

The effects are described below. With the hybrid drive force transmission device of Embodiment 2, the following effects can be obtained.

(3) The aforementioned clutch is a dry multi-plate clutch 7, where an oil seal (second oil seal 14) that suppresses ingress of oil from the bearing space Sb to the clutch space Sc in which the dry multi-plate clutch 7 is disposed between opposing surfaces in the radial direction of the outer circumferential surface 2a of the first rotating shaft member (clutch hub shaft 2) and the inner circumferential surface 62a of the ring-shaped protrusion 62 formed in the separating wall part 6b, a thrust bearing (needle bearing 20) is disposed between axially opposing surfaces of a step surface 4b of the second rotating shaft member (clutch drum shaft 4) and an end surface 2b of the first rotating shaft member (clutch hub shaft 2), the step surface 4b being a setting surface on which a ring-shaped bearing member having an integrated structure is set, the oil seal (second oil seal 14) contacts a seal surface at the first rotating shaft member (clutch hub shaft 2) and a pressed-upon surface at the separating wall part 6b. For this reason, in addition to the effects of (1) and (2) in Embodiment 1, by simply subjecting the first rotating shaft member (clutch hub shaft 2) to thermal treatment such as carburizing to improve material hardness, the cost of the clutch peripheral configuration can be additionally decreased.

Although the drive force transmission device of the present invention was described above with reference to Embodiment 1 and Embodiment 2, the specific configuration is not restricted to these embodiments, and various design modifications and additions are permissible while remaining within the spirit of the invention as described in the claims.

In Embodiments 1 and 2, a normal-open multi-plate dry clutch was presented as an example. However, in another example, the clutch may be a single-plate wet clutch, a multi-plate wet clutch, a single-plate dry clutch or some other type of hydraulically actuated clutch. Moreover, another example of the clutch is a normal-closed clutch that employs a diaphragm spring or the like.

In Embodiments 1 and 2, a preferred example of a hybrid drive force transmission device for a hybrid vehicle was presented in which the engine and motor/generator were mounted, and the clutch was a drive-mode transition clutch. However, this is also suitable for engine drive force transmission devices in which only an engine is mounted as a drive source, and the clutch is used as a start clutch, as with engine automobiles. In addition, the invention also is suitable for use in motor drive force transmission devices in which only a motor/generator is mounted as a drive source, and the clutch is used as a start clutch, as with electric vehicles.

The invention claimed is:

1. A drive force transmission device comprising:
   a hub member;
   a drum member having a cylindrical part and a separating wall part extending radially inward from the cylindrical part to partition a drum interior space into a bearing space and a clutch space;
   a clutch operatively interposed between the hub member and the drum member to transmit drive power upon engagement and cease to transmit drive power upon disengagement, the clutch having a plate member supported by the cylindrical part of the drum;
   a first rotating shaft member coupled to the hub member to rotate integrally with the hub member;

a second rotating shaft member coupled to the separating wall part of the drum member to rotate integrally with the drum member; and a support member disposed at an outer circumferential position on the second rotating shaft member and rotatably supporting the second rotating shaft member via a bearing;

the support member including a restriction part that restricts axial movement of an outer race of the bearing, the restriction part being provided at an end position of the support member towards the separating wall part, and the separating wall part having a bottom portion being partially disposed at an inner circumferential position with respect to the restriction part, the bottom portion of the separating wall part having a radially extending centerline that is offset by a bearing-side offset amount towards the bearing space with respect to a radially extending centerline of a top portion of the separating wall part so that the separating wall part extends radially inward of the restriction part and the bottom portion of the separating wall does not extend radially inward of the bearing as viewed perpendicular to a rotational axis of the drum member.

2. The drive force transmission device as claimed in claim 1, wherein the bearing is an integrated bearing including two sets of rolling bodies interposed between an inner race and the outer race with a first set of the two sets of rolling bodies being axially space from a second set of the two sets of rolling bodies.

3. The drive force transmission device as claimed in claim 2, wherein the clutch is a dry multi-plate clutch that is disposed in the clutch space, with the drive force transmission device further comprising an oil seal being disposed between radially opposing surfaces of an outer circumferential surface of the first rotating shaft member and an inner circumferential surface of a ring-shaped protrusion formed in the separating wall part to suppress an ingress of oil from the bearing space to the clutch space, the oil seal contacting a seal surface of the outer circumferential surface of the first rotating shaft member and a pressed-upon surface of the inner circumferential surface of the separating wall part, and a thrust bearing being disposed between axially opposing surfaces of a step surface of the second rotating shaft member and an end surface of the first rotating shaft member, the step surface being a setting surface for a ring-shaped bearing member of the thrust bearing having an integrated structure.

4. The drive force transmission device as claimed in claim 1, wherein the clutch is a dry multi-plate clutch that is disposed in the clutch space, with the drive force transmission device further comprising an oil seal being disposed between radially opposing surfaces of an outer circumferential surface of the first rotating shaft member and an inner circumferential surface of a ring-shaped protrusion formed in the separating wall part to suppress an ingress of oil from the bearing space to the clutch space, the oil seal contacting a seal surface of the outer circumferential surface of the first rotating shaft member and a pressed-upon surface of the inner circumferential surface of the separating wall part, and a thrust bearing being disposed between axially opposing surfaces of a step surface of the second rotating shaft member and an end surface of the first rotating shaft member, the step surface being a setting surface for a ring-shaped bearing member of the thrust bearing having an integrated structure.

* * * * *